(12) United States Patent
Cheng et al.

(10) Patent No.: US 8,626,214 B2
(45) Date of Patent: Jan. 7, 2014

(54) METHOD OF CANCELLING INTERFERENCE IN SOUNDING REFERENCE SIGNALS

(75) Inventors: Fang-Chen Cheng, Randolph, NJ (US); Ren Da, Warren, NJ (US)

(73) Assignee: Alcatel Lucent, Paris (FR)

( * ) Notice: Subject to any disclaimer, the term of this patent is extended or adjusted under 35 U.S.C. 154(b) by 210 days.

(21) Appl. No.: 13/158,578

(22) Filed: Jun. 13, 2011

(65) Prior Publication Data

US 2011/0312355 A1 Dec. 22, 2011

Related U.S. Application Data

(60) Provisional application No. 61/357,222, filed on Jun. 22, 2010.

(51) Int. Cl.
*H04B 15/00* (2006.01)
*H04W 72/08* (2009.01)

(52) U.S. Cl.
USPC ........ 455/501; 455/67.13; 455/296; 455/63.1

(58) Field of Classification Search
USPC ................ 455/67.11, 456.1, 500, 501, 67.13, 455/226.1, 502, 509, 63.1, 296, 295; 375/344, 362, 260, 346, 219, 347; 370/350, 528
See application file for complete search history.

(56) References Cited

U.S. PATENT DOCUMENTS

| 2002/0181439 A1* | 12/2002 | Orihashi et al. ............... 370/350 |
| 2007/0066231 A1* | 3/2007 | Duffett-Smith et al. ... 455/67.11 |
| 2009/0135931 A1* | 5/2009 | Kawauchi et al. ............ 375/260 |

OTHER PUBLICATIONS

R1-105997; Alcatel-Lucent, Alcatel-Lucent Shanghai Bell "UTDOA Performance with SRS Interference Cancellation" 3GPP TSG RAN WG1#63, Jacksonville, FL., U.S.A. Nov. 15-19, 2010.
R1-101870; Alcatel-Lucent, Alcatel-Lucent Shanghai Bell "TDOA System Analysis and Performance" 3GPP TSG RAN WG1#60bis; Beijing, China, Apr. 12-16, 2010.
R1-100023; CATT, Potevio, Pantech, "Considerations on Enhanced SRS Transmission Schemes" 3GPP TSG RAN WG1 meeting #59bis; Valencia, Spain, Jan. 18-22, 2010.
R1-100446; MediaTek, Inc., "LTE Network Based Positioning Using Sounding Reference Signal" 3GPP TSG RAN WG1 Meeting #59bis; Valencia, Spain, Jan. 18-22, 2010.

* cited by examiner

*Primary Examiner* — John J Lee (57) ABSTRACT

The present invention provides a method of interference cancellation. Embodiments of the method may include removing one or more first reference signals from a signal received by a first base station to form a modified signal. The signal includes a superposition first reference signal(s) transmitted by first user equipment served by the first base station and one or more second reference signals transmitted by second user equipment served by a second base station. The method may also include extracting the second reference signal(s) from the modified signal and determining a timing delay between the second user equipment and the first base station using the extracted second reference signal(s).

16 Claims, 7 Drawing Sheets

METHOD OF CANCELLING INTERFERENCE IN SOUNDING REFERENCE SIGNALS

CROSS REFERENCE TO RELATED APPLICATIONS

This application claims priority to U.S. Provisional Patent Application No. 61/357,222, filed on Jun. 22, 2010.

BACKGROUND

This invention relates generally to communication systems, and, more particularly, to wireless communication systems.

Wireless communication systems implement a network of base stations or other access nodes to provide wireless connectivity to different geographical areas or cells. User equipment or other access terminals located within the cells can access the wireless communication system by establishing an over the air communication session with one or more access nodes. User equipment may also be able to move or roam between different cells and so the wireless communication system typically implements mobility functionality that allows the system to hand off user equipment between different access nodes and to keep track of the serving access node for the user equipment. However, in some circumstances the network may need or want to determine a more precise geographical location of user equipment. For example, the network may provide location-dependent services that use the geographic location (e.g., coordinates such as latitude-longitude) of user equipment to configure the services provided to the user equipment. For another example, the network may provide emergency services that allow user equipment to be located in emergency, e.g., in response to a 911 call from the user equipment.

Wireless communication devices, particularly mobile user equipment, often implement global positioning system (GPS) functionality to determine the geographic location of the device using multiple GPS satellite signals. However, GPS functionality consumes significant battery power and so users often disable or turn off the GPS functionality when they are not using a specific location-dependent service that requires geographic information. Disabled GPS functionality may be unable to provide requested location information in emergency situations and enabling a disabled GPS function and then acquiring the necessary satellite signals may introduce significant time delays. Furthermore, GPS functionality may not work when the user equipment is obscured or shielded and unable to acquire the necessary number of satellite signals.

The geographic locations of user equipment can also be determined by triangulation or trilateration using distances between the user equipment and multiple base stations. For example, user equipment can determine its geographic location using downlink observed time difference of arrival (OTDOA) measurements for signals transmitted by a group of neighboring base stations. The difference between the arrival times of signals from two different base stations can be used to determine a locus of possible user equipment locations. The locus typically includes more than one candidate location and the redundancy/degeneracy can be broken using one or more additional loci determined using the OTDOA for signals received from another pair of base stations. However, the base stations that transmit the positioning reference signals (PRS) may need to limit or mute transmission concurrently with transmitting the OTDOA signals to reduce interference so that the user equipment can detect the downlink signals with a sufficiently high signal-to-noise ratio (SNR) or signal to interference-plus-noise ratio (SINR). This can significantly impact overall system capacity. Moreover, OTDOA techniques require additional functionality and computing power at the user equipment.

SUMMARY OF EXEMPLARY EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for interference cancellation. Embodiments of the method may include removing one or more first reference signals from a signal received by a first base station to form a modified signal. The signal includes a superposition first reference signal(s) transmitted by first user equipment served by the first base station and one or more second reference signals transmitted by second user equipment served by a second base station. The method may also include extracting the second reference signal(s) from the modified signal and determining a timing delay between the second user equipment and the first base station using the extracted second reference signal(s).

In another embodiment, a method is provided for interference cancellation. Embodiments of the method may include modifying a signal received by a first base station using one or more estimated values of one or more first channels received by the first base station. The signal includes a superposition of the first channel(s) transmitted by first user equipment served by the first base station and one or more second channels transmitted by second user equipment served by a second base station. Embodiments of the method may also include extracting the second channel(s) from the modified signal and determining a timing delay between the second user equipment and the first base station using the extracted second channel(s).

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques that can be used to support location determination using uplink time delay of arrival (UTDOA) measurements. The location of user equipment can be determined using uplink time delay of arrival measurements for signals (such as sounding reference signals) transmitted from the user equipment to its serving base station and two or more neighboring base stations. Since the neighboring base stations have not been chosen as the serving base station, it is very likely that the user equipment is located near the edge or even outside of the cell boundaries of the neighboring base stations. The signal strength received at the neighboring base station from the user equipment is therefore relatively weak compared to the signal strength received at the neighboring base station from user equipment that are operating within the neighbor cell and/or are served by the neighbor cell. Consequently, user equipment operating within the neighbor cell can generate strong interference for the signals received from the user equipment associated with the serving cell. For example, cross-correlations between sounding reference signals generated using different root sequences can create noise or interference between the user equipment in a synchronized communication system. Sequence hopping could be used to randomize the interference but this has not been shown to provide sufficient uplink time delay of arrival performance.

The present application therefore describes embodiments of interference cancellation and/or noise removal techniques. In one embodiment, each neighboring cell extracts reference signals transmitted by user equipment served by the neighboring cell from a received signal. For example, a neighboring cell can decode sounding reference signal transmissions from user equipment within the neighboring cell. The received signal may be a superposition of the reference signals from user equipment served by the neighboring cell and reference signals from user equipment served by the serving cell. The extracted reference signals may be fed back so that they can be subtracted from a delayed version of the received signal. For example, the decoded sounding reference signals from user equipment and the neighboring cell can be subtracted from the received sounding reference signal symbol before performing decoding of the sounding reference signal symbol from the target user equipment for the UTDOA measurement. Reference signals received from user equipment served by the serving cell may then be extracted following removal of the feedback signals. In some embodiments, the reference signals are accumulated over multiple subframes, e.g., to enhance the signal-to-noise or signal-to-interference-plus-noise ratios. The accumulated signals can then be used to estimate timing delays between the user equipment and the receiving base station.

Figure 1:
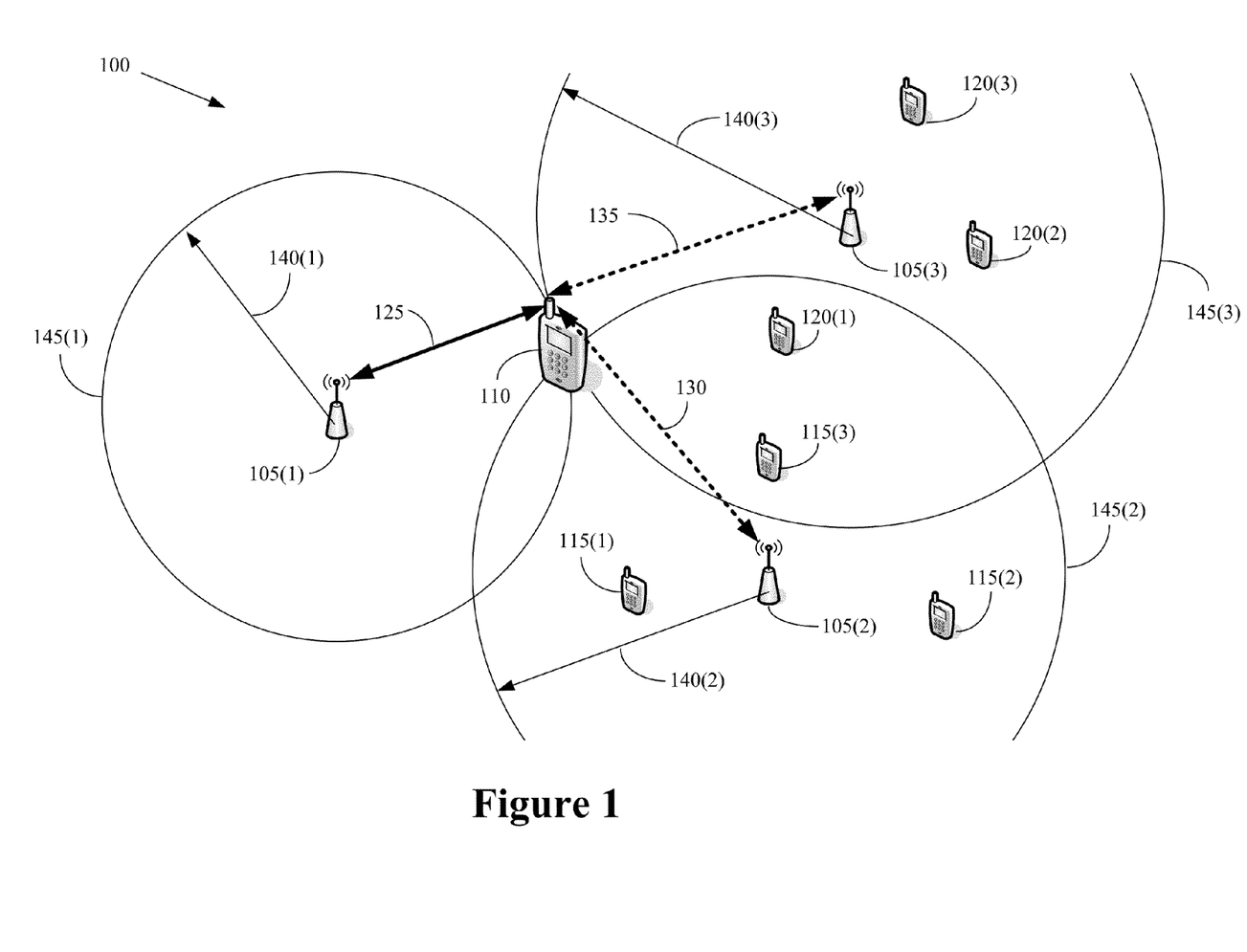
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 includes a network of access nodes such as base stations 105 that are used to provide wireless connectivity within corresponding geographic areas or cells. Alternative access nodes include access points, base station routers, evolved Node Bs, and the like. The base stations 105 can be configured to provide wireless connectivity according to various standards and/or protocols. In the interest of clarity, only those aspects of the standards and/or protocols that are relevant to the claimed subject matter will be discussed in detail herein. User equipment 110, 115, 120 may access the wireless communication system 100 by establishing associations or connections with one or more of the base stations 105. Exemplary user equipment 110, 115, 120 may include devices that are able to move freely, which are generally referred to as mobile devices, and/or devices that are stationary or more difficult to move, which are generally referred to as fixed devices.

The base stations 105 serve access terminals in different cells that may or may not overlap in some areas. In the illustrated embodiment, the base station 105(1) is the serving access node for user equipment 110, as indicated by the arrow 125. User equipment 115 are served by the base station 105(2) and user equipment 120 are served by the base station 105(3). In the interest of clarity, the specific connections or associations between user equipment 115, 120 and base stations 105(2-3) are not indicated by arrows. The base stations 105(2-3) may be able to receive signals from the user equipment 110 even though user equipment 110 is not served by either of the base stations 105(2-3). In the illustrated embodiment, sounding reference signals transmitted by user equipment 110 can be received at the base stations 105(2-3), as indicated by dashed arrows 130, 135. However, as discussed herein, signals received at the base stations 105(2-3) from the user equipment 110 may be relatively weak compared to signals received at the base stations 105(2-3) from user equipment 115, 120. Furthermore, signals received from the user equipment 110 may be obscured by interference or noise generated by the user equipment 115, 120 that are served by the neighboring base stations 105(2-3). This interference can be removed or canceled by extracting signals transmitted by the user equipment 115, 120 from the received signal before attempting to decode the relatively weak signals received from user equipment 110, as discussed herein.

User equipment 110 can be located using uplink signals received at the base stations 105. In the illustrated embodiment, user equipment 110 transmits sounding reference signals over uplink channels that can be received by the base stations 105, e.g., as indicated by the arrows 125, 130, 135. If the timing errors and/or time offset of the user equipment 110 is known precisely (e.g., within a particular tolerance), the timing of the received uplink signals can be compared to a timing reference that is used to synchronize the base stations 105 to determine a timing delay that indicates distances between the user equipment 110 and the base stations 105. For example, each of the base stations 105 may determine a corresponding timing delay that indicates a distance 140 between the base station 105 and the user equipment 110. Each base station 105 could therefore determine that the user equipment 110 is located on a circle 145 defined by the corresponding distance or radius 140. The location of the user equipment 110 can be determined by combining information indicative of multiple circles 145. Alternatively, if the timing errors and/or time offset of the user equipment 110 is not known, trilateration based on the relative time delays of arrival for signals received at different base stations 105 can be used to determine the location of the user equipment 110. For example, a trilateration algorithm may be used so that the unknown timing error and/or time offset associated with the user equipment 110 is at least partially canceled out by taking the difference of the two timing measurements for the user equipment 110.

Figure 2:
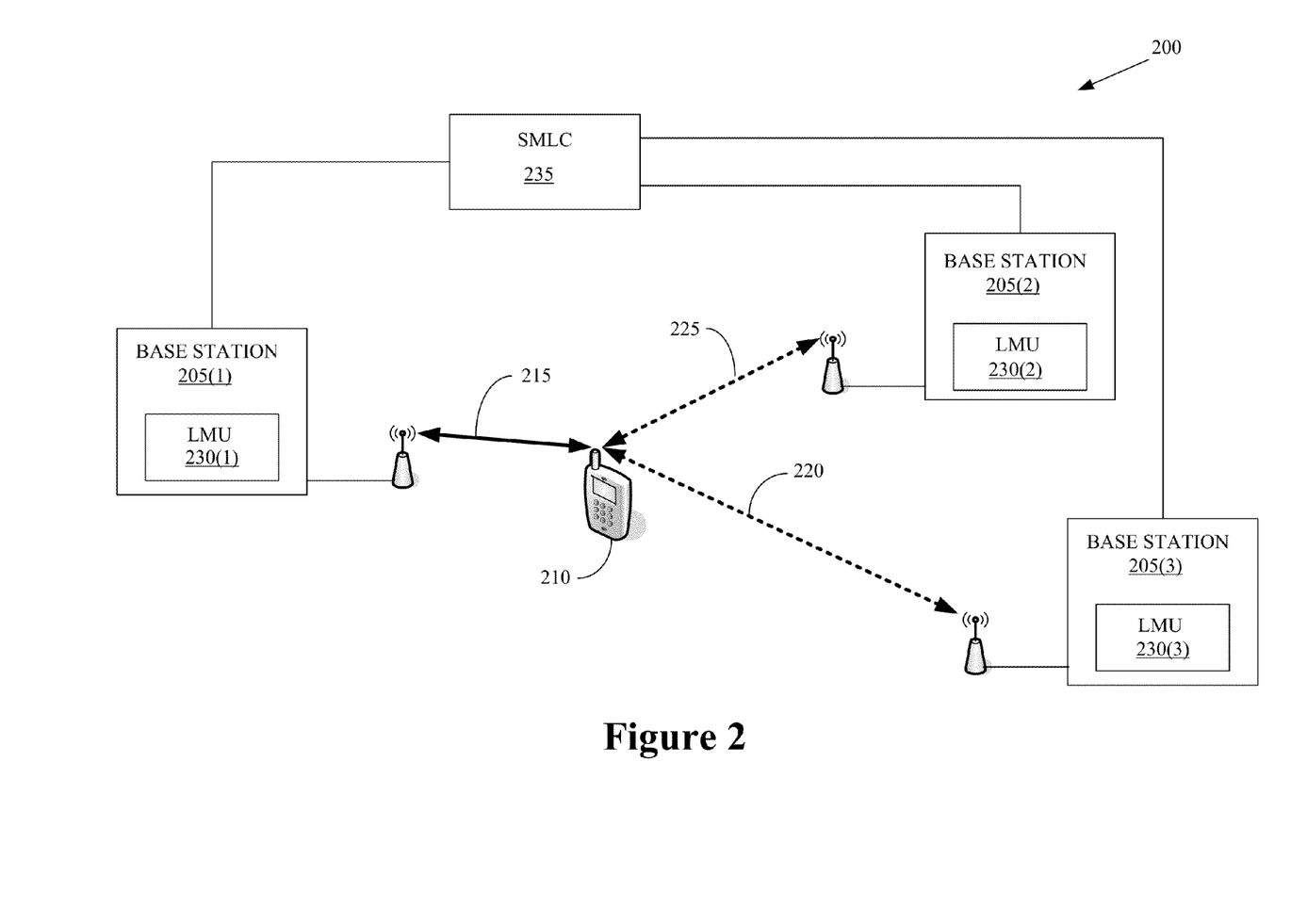
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes access nodes such as base stations 205 that are used to provide wireless connectivity to one or more user equipment 210. For example, base station 205(1) is the serving base station for user equipment 210, as indicated by the arrow 215. The user equipment 210 may therefore establish wireless communication links over air interface channels with the serving base station 205(1). Signals transmitted by the user equipment 210 may also be received at other neighboring base stations such as the base stations 205(2-3) even though these base stations are not serving base stations for the user equipment 210, as indicated by the dotted arrows 220, 225. The neighboring base stations 205(2-3) may attempt to decode signals received from the user equipment 210 and use the decoded signals for various purposes such as location determination.

In the illustrated embodiment, the user equipment 210 transmits reference signals such as pilot signals or sounding reference signals over the air interface. The reference signals have a predetermined format so that the base stations 205 can decode the signals and use the decoded information to determine a time delay relative to the reference time used to synchronize operation of the base stations 205. In one embodiment, the user equipment 210 may transmit constant amplitude zero autocorrelation (CAZAC) sequences over the air interface on channels allocated for transmission of reference signals. For example, the user equipment 210 may generate a sounding reference signal sequence $S^{SRS}$ using a cyclic shift of a root sequence:

$$s^{SRS}(n) = e^{j\alpha n} s_{u,v}(n)$$

where $s_{u,v}(n)$ is a root or base sequence, $\mu$ the physical uplink control channel (PUCCH) sequence-group number, and v is the base sequence number. The cyclic shift a of the sounding reference signal is given as $$\alpha = 2\pi \frac{n_{SRS}^{cs}}{8},$$

where $n_{SRS}^{cs}$ is configured for each user equipment by higher functional layers and $n_{SRS}^{cs}=0, 1, 2, 3, 4, 5, 6, 7$. Exemplary CAZAC sequences include Zadoff-Chu sequences, which are complex-valued mathematical sequences that can be applied to radio signals to generate an electromagnetic signal of constant amplitude. A Zadoff-Chu sequence exhibits the useful property that cyclically shifted versions of the sequence are substantially orthogonal to one another when each cyclic shift, viewed within the time domain of the signal, is substantially greater than the combined propagation delay and multipath delay-spread of that signal between the transmitter and receiver.

Figures 3, 5:
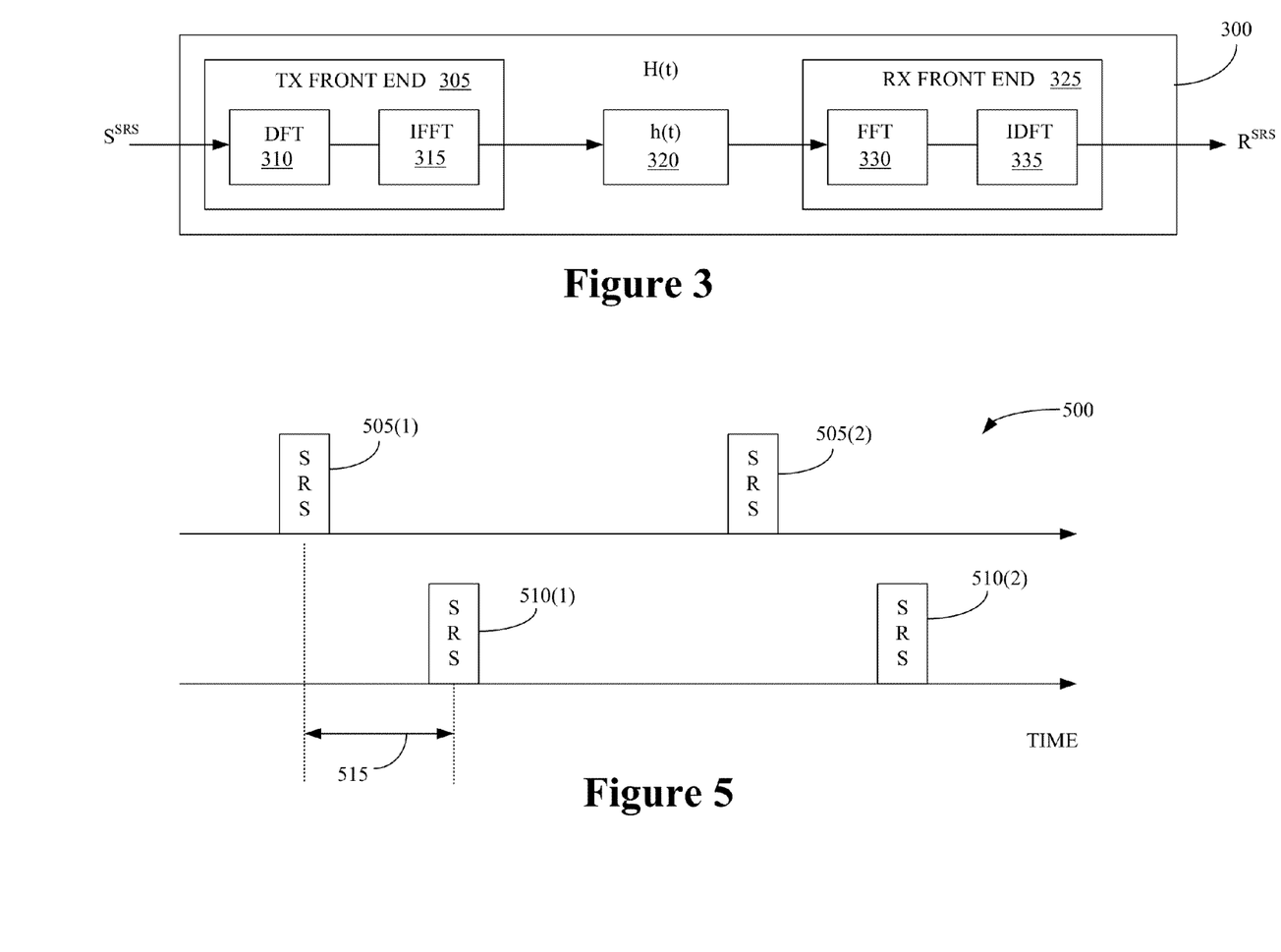
FIG. 3 conceptually illustrates one exemplary embodiment of an equivalent frequency domain channel (H(t)) for sounding reference signal transmission and reception.
FIG. 5 conceptually illustrates one exemplary embodiment of a timing diagram.

FIG. 3 conceptually illustrates one exemplary embodiment of an equivalent frequency domain channel (H(t)) 300 for sounding reference signal (SRS) transmission and reception. In the illustrated embodiment, the source signal ($S^{SRS}$) is generated and provided to a transmitter front-end 305. As discussed herein, the source signal may be an orthogonal sequence such as a CAZAC sequence. The transmitter front-end 305 includes a discrete Fourier transform (DFT) element 310 and an inverse fast Fourier transform (IFFT) element 315. The transmitter front-end 305 then provides the signal over the air interface channels (h(t)) 320 and the transmitted signal is received at the receiver front-end 325, which includes a fast Fourier transform (FFT) element 330 and an inverse discrete Fourier transform (IDFT) element 335 for generating the received signal, $R^{SRS}$.

Referring back to FIG. 2, the illustrated embodiments of the base stations 205 each include a location management unit (LMU) 230 that is configured to generate location information using received signals, such as the sounding reference signals received from user equipment 210. For example, the LMUs 230 associated with the base stations 205 may be configured to measure a time delay for reference signals received from the user equipment 210 so that the location of the user equipment 210 may be determined. Although the LMUs 230 are shown as being implemented within the base stations 205, persons of ordinary skill in the art having benefit of the present disclosure should appreciate that in alternative embodiments the LMUs 230 may be implemented in other locations, e.g., they may be standalone devices that are electronically and/or communicatively connected to the base stations 205. In the illustrated embodiment, each LMU 230 accesses signal energy that is received over a reference channel and uses this information to attempt to decode reference signals transmitted by the user equipment 210. The received signal energy may be a superposition of signals received from different user equipment. For example, the signal energy received by the base station 205(2) may be a superposition of the reference signal transmitted by the user equipment 210 and reference signals transmitted by other user equipment served by the base stations 205. The LMUs 230 may therefore modify the received signal by removing estimated signals or channels for user equipment served by the corresponding base station 205 before attempting to decode the reference signal transmitted by the user equipment 210.

Figure 4:
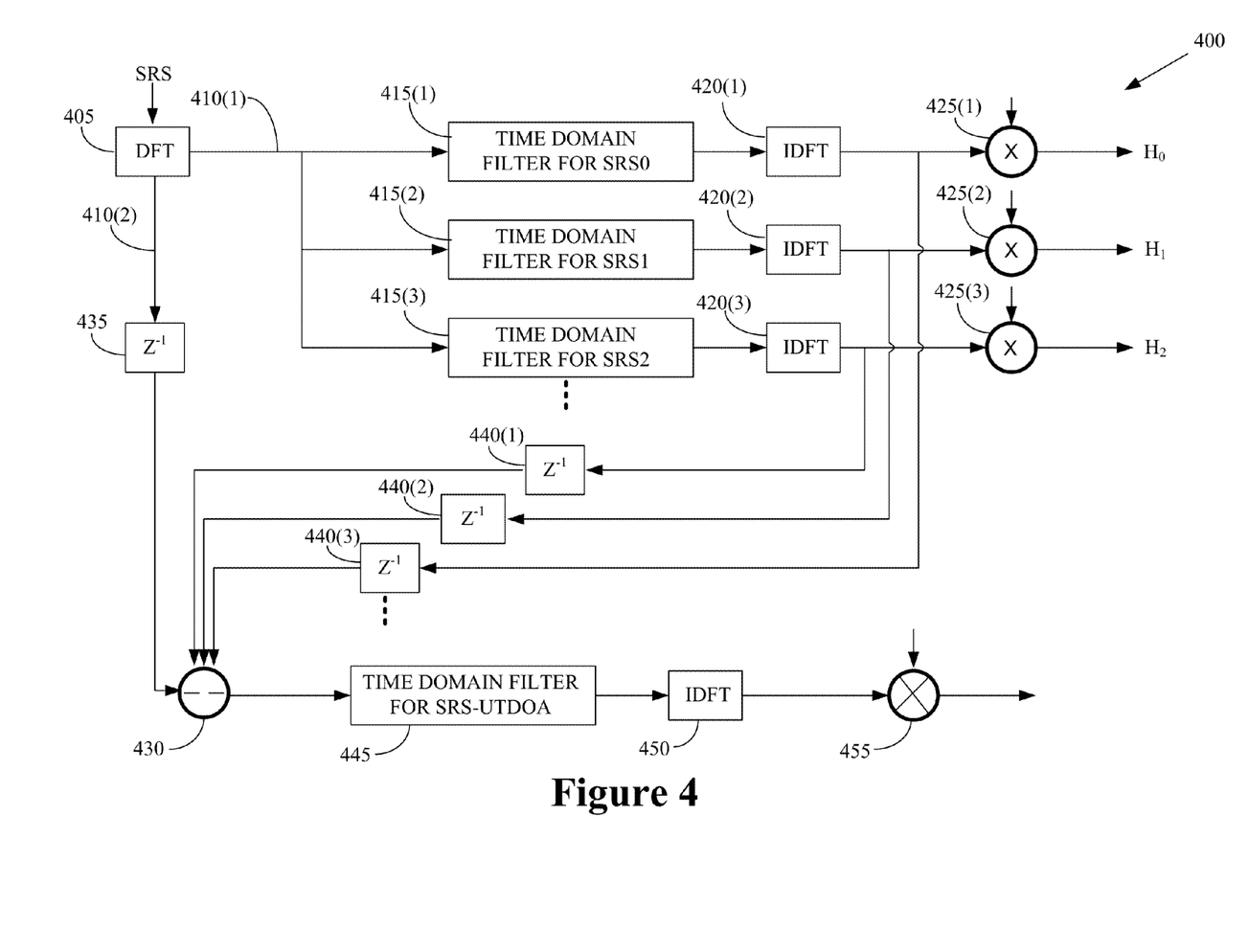
FIG. 4 conceptually illustrates one exemplary embodiment of a location management unit.

FIG. 4 conceptually illustrates one exemplary embodiment of a portion of a location management unit 400. One function of the location management unit 400 is to identify and decode reference signals transmitted by user equipment that are not served by the base station associated with the location management unit 400. For example, the location management unit 400 may be used to measure time delays for reference signals transmitted by a target user equipment that is served by a different base station. The location management unit 400 may therefore remove or cancel interference caused by reference signals transmitted by user equipment served by the base station associated with the location management unit 400. Reference signals from the target user equipment may then be identified in the received signal after performing interference cancellation.

In the illustrated embodiment, the location management unit 400 includes a discrete Fourier transform (DFT) element 405 that receives signals transmitted over the reference signal channel and performs a discrete Fourier transform on the received signals. The transformed signals may then be provided to two branches 410. Signals transmitted on the first branch 410(1) are provided to one or more time domain filters 415 that are used to filter or extract reference signals received from user equipment served by the base station associated with the location management unit 400. In one embodiment, the reference signals for different user equipment are cyclically shifted versions of a root sequence and so the different reference signals are shifted relative to each other in the time domain. The time domain filters 415 can therefore be configured to filter out all of the reference signals except the desired reference signal from a particular user equipment served by the base station. The individual reference signals are then provided to a corresponding inverse discrete Fourier transform (IDFT) element 420 and provided to multiplier elements 425 to multiply these signals by the conjugate of the corresponding cyclically shifted root sequence to generate the channel ($H_i$) corresponding to the reference signal.

The second branch 410(2) provides the received signals to a subtraction element 430, which also receives feedback signals from the IDFT elements 420 of the first branch 410(1). The feedback signals include signal energy for the reference signals transmitted by user equipment that are served by the base station associated with the location management unit 400. The subtraction element 430 removes the signal energy for the feedback reference signals from the received signal. Delay elements 435, 440 are used to delay the signals in the first and second branches 410 so that the signals that are fed back for a particular symbol transmitted over the air interface are synchronized with the same symbol in the received signal at the subtraction element 430. The modified signal is then provided to a time domain filter 445 that is used to filter or extract the reference signal received from the target user equipment that is not served by the base station associated with the location management unit 400. The individual reference signal may be provided to a corresponding inverse discrete Fourier transform (IDFT) element 450 and then to a multiplier element 455 to multiply the signal by the conjugate of the corresponding cyclically shifted root sequence to generate the channel ($H_i$) corresponding to the reference signal.

In one embodiment, the location management unit 400 may be used to generate timing information for uplink time difference of arrival (UTDOA) calculations. For example, the received SRS signals may be a transposition of reference signals received from user equipment being served by various different base stations when multi-cell SRS transmissions are coordinated, e.g., using a common timing reference signal for transmissions in the different cells. The received SRS signal can therefore be expressed as:

$$R^{SRS} = \sum_i H_i S_i^{SRS} + N = \sum_j H_j S_j^{SRS} + \sum_k H_k S_k^{SRS} + N$$

where the subscripts j and k represent the SRS transmission from user equipment in the serving cell and the neighbor measuring cell that implements the location management unit 400, respectively.

The SRS signals that are received at the neighbor cell for performing UTDOA measurements may contain a superposition of the target SRS signals from the user equipment associated with the serving cell j and SRS signals of user equipment from all other cells including the measuring cell k. The primary interference for the target user equipment SRS is the SRS transmission from user equipment in the neighbor measuring cell k. The SRS transmissions of user equipment from cells other than the measuring cell k may be considered noise. The SRS interference cancellation scheme attempts to cancel out SRS transmission from user equipment in the measuring cell. The interference cancellation can be represented as:

$$\tilde{R}_j^{SRS} = R^{SRS} - \sum_k \hat{H}_k S_k^{SRS} = \sum_j H_j S_j^{SRS} + \sum_k (H_k - \hat{H}_k) S_k^{SRS} + N$$

where $\hat{H}_k$ represents the channel that is fed back so that it can be removed from the received symbol. The target SRS for UTDOA measurements may then be extracted from the serving cell SRS signals through zero-out filtering in the time domain. The filtering procedure may be represented as:

$$\tilde{R}_{UTDOA}^{SRS} = \text{Filter}(\tilde{R}_j^{SRS}) =$$
$$\hat{H}_{UTDOA} S_{UTDOA}^{SRS} + \sum_{j \neq UTDOA} (H_j - \hat{H}_j) S_j^{SRS} + \sum_k (H_k - \hat{H}_k) S_k^{SRS} + N$$

where $\hat{H}_j$ represents the channels for user equipment in the serving cell other than the target user equipment for the UTDOA measurement. The residual errors between the actual channels and the estimated channels are very small. The target SRS after SRS interference cancellation may therefore be approximately represented as:

$$\hat{R}_{UTDOA}^{SRS} \approx \hat{H}_{UTDOA} S_{UTDOA}^{SRS} + N$$

In one embodiment, the SRS signals after interference cancellation are accumulated through multiple SRS subframes and then timing offset estimation algorithm is applied to determine the timing delay associated with propagation between the target user equipment and the measuring cell.

Referring back to FIG. 2, the LMUs 230 may provide the timing information for the reference signals to a central entity that can use the timing information to estimate the location of the user equipment 210. In the illustrated embodiment, the LMUs 230 provide measured timing delays (relative to a reference time used by the base stations 205) for signals received from the user equipment 210 to a serving mobile location center (SMLC) 235. Embodiments of the illustrated SMLC 235 may be network elements in networks such as Global System for Mobile communication (GSM) networks. The SMLC 235 may be implemented in a base station controller and may be configured to calculate a network-based location of user equipment such as user equipment 210. In the illustrated embodiment, the SMLC 235 uses the received timing information to determine relative time delays of arrival for signals received at the different base stations 205.

FIG. 5 conceptually illustrates one exemplary embodiment of a timing diagram 500. In the illustrated embodiment, the timing diagram depicts reference signals 505, 510 received from a target user equipment by different base stations. These signals are synchronized to a common timing reference used by both base stations. A central entity, such as an eSMLC, can gather the timing information from the different base stations and then use it to determine the relative time delays of arrival 515 between signals received at different base stations from the target user equipment.

Referring back to FIG. 2, the eSMLC 235 can use the relative time difference of arrival for signals received by pairs of the base stations 205 to estimate the location of the user equipment 210. For example, the relative uplink time difference of arrival defines a hyperbola that includes the locus of points where the absolute value of the difference of the distances to the two foci (e.g., the pair of base stations) is a constant determined by the relative uplink time difference of arrival. When time difference of arrivals are measured for signals received by three or more base stations, well known triangulation techniques can be used to identify the location of the user equipment 210, e.g., using the intersections of the various hyperbolas.

Figure 6:
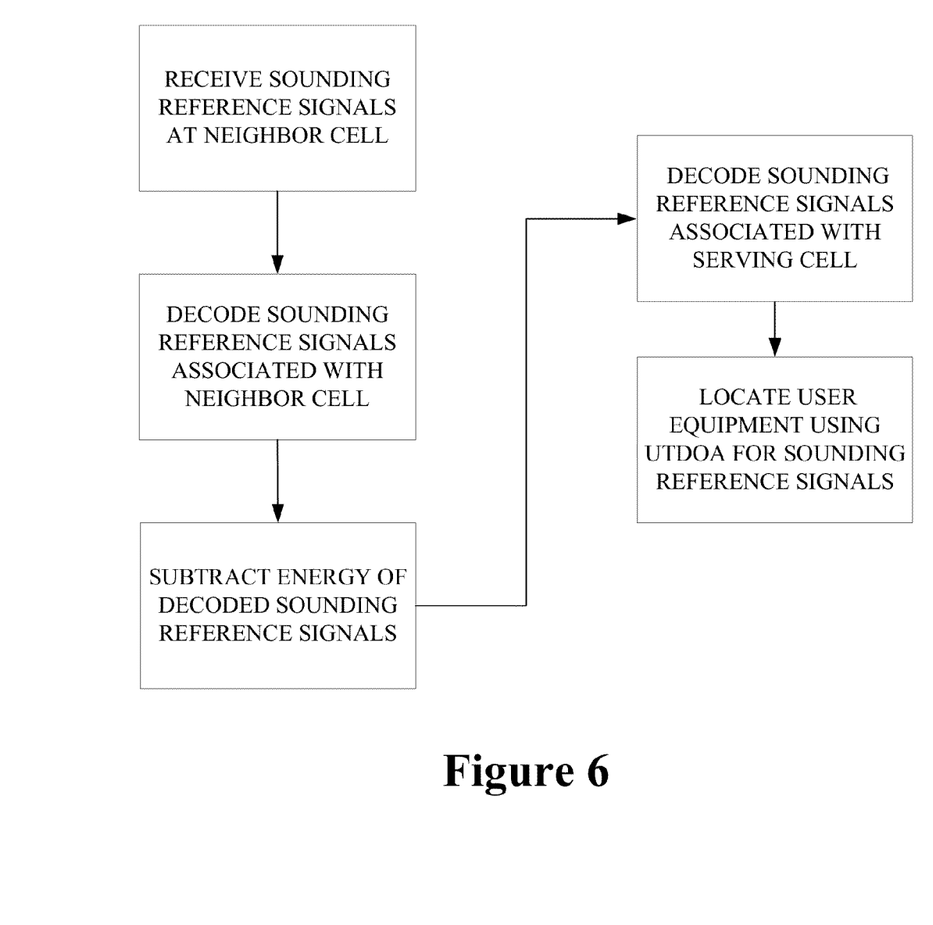
FIG. 6 conceptually illustrates one exemplary embodiment of a method for estimating the location of user equipment using sounding reference signals.

FIG. 6 conceptually illustrates one exemplary embodiment of a method 600 for estimating the location of user equipment using sounding reference signals. In the illustrated embodiment, a target user equipment transmits sounding reference signals over the air interface and the signals are received (at 605) at the serving cell and one or more neighbor cells. Neighbor cells may also receive sounding reference signals from user equipment being served by the neighbor cell. The neighbor cell may therefore decode (at 610) the sounding reference signals received from user equipment that the neighbor cell is serving. Energy associated with these user equipment may then be subtracted (at 615) from the received signal to form a modified signal. Sounding reference signals transmitted by the target user equipment may then be decoded (at 620) from the modified signal. The neighbor cell may then provide timing information associated with the target user equipment sounding reference signal to a central entity that can use this information to locate (at 625) the target user equipment by applying uplink time delay of arrival techniques to relative timing delays that are determined using information provided by serving and neighbor cells.

Figure 7:
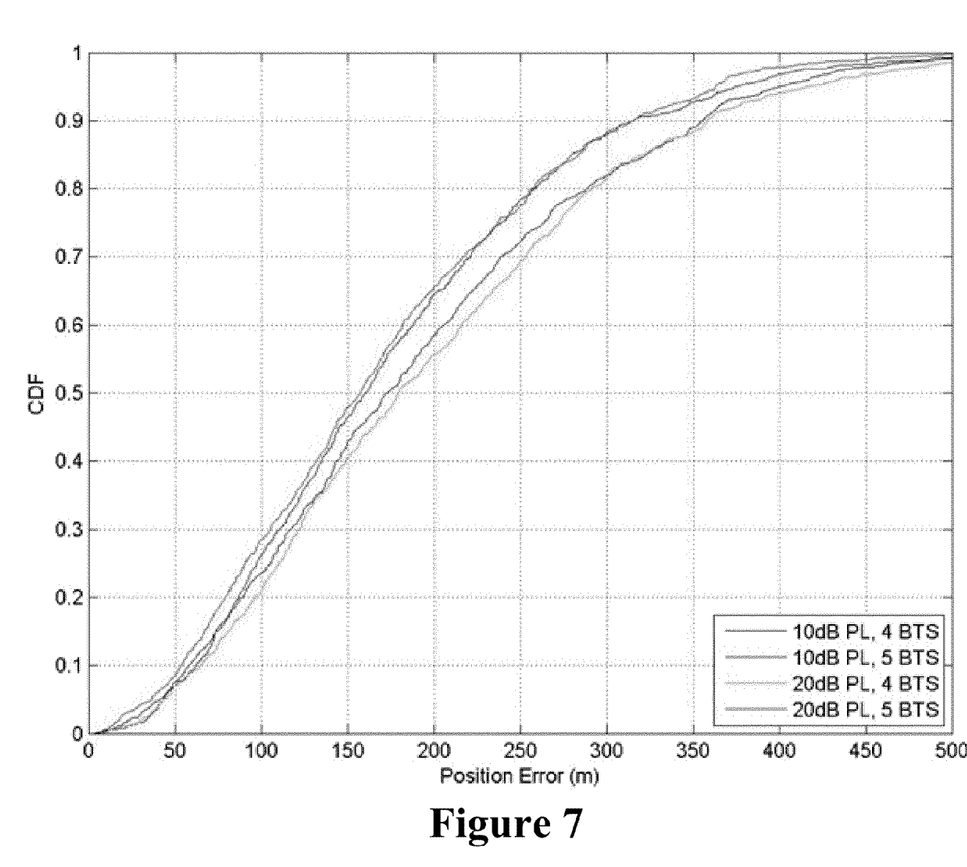
FIGS. 7 and 8 show the results of performing location estimation using UTDOA with and without using embodiments of the sounding reference signal interference cancellation described herein.
Figure 8:
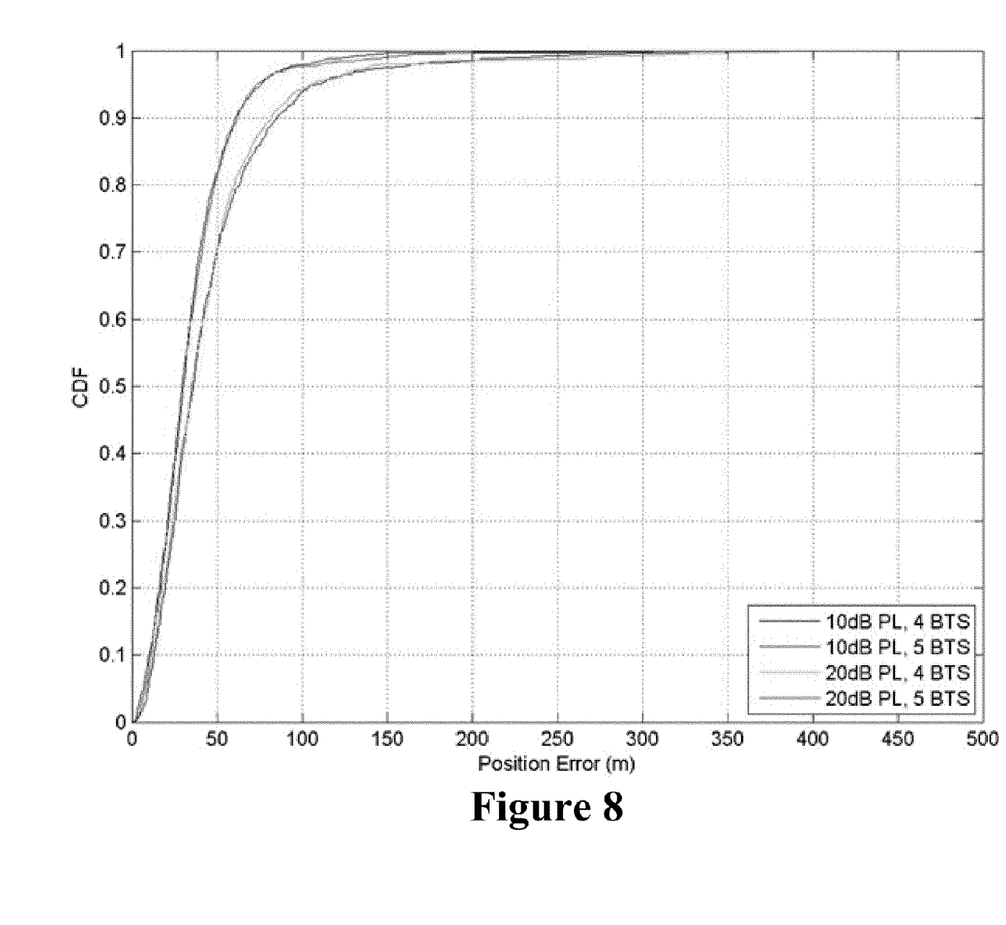

FIGS. 7 and 8 show the results of performing location estimation using UTDOA with and without using embodiments of the sounding reference signal interference cancellation described herein. FIGS. 7 and 8 show the cumulative distribution function (CDF) of position errors (measured in meters) for different sets of simulation parameters. In both embodiments, the sounding reference signals are accumulated over 100 subframes before performing the timing offset estimation. The United States Federal Communications Commission (US FCC) mandated performance requirements for terrestrial positioning technology require that the system locate user equipment with an error of less than 150 m at least 67% of the time. The US FCC regulations also require that the system be able to locate user equipment within an error of less than 300 m at least 95% of the time. FIG. 7 shows the CDF of the position error when no interference cancellation is used. The results in FIG. 7 indicate that a position error of less than 150 m is only achieved approximately 40-50% of the time and a position error of less than 300 m is achieved less than 90% of the time for the cases considered. These results do not meet the US FCC requirements. FIG. 8 shows the CDF of the position error when embodiments of the interference cancellation techniques described herein are used. The results in FIG. 8 indicate that a position error of less than 150 m is achieved approximately 95-97% of the time and a position error of less than 300 m is achieved almost 100% of the time. The results in FIG. 8 therefore meet the US FCC requirements.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:

removing at least one first reference signal from a signal received by a first base station to form a modified signal, wherein the signal comprises a superposition of said at least one first reference signal transmitted by first user equipment served by the first base station and at least one second reference signal transmitted by second user equipment served by a second base station;

extracting said at least one second reference signal from the modified signal; and determining a timing delay between said second user equipment and the first base station using said at least one extracted second reference signal.

2. The method of claim 1, wherein removing said at least one first reference signal from the signal comprises filtering said at least one first reference signal from the signal using a time domain filter and subtracting said at least one filtered first reference signal from the signal received by the first base station.

3. The method of claim 2, wherein removing said at least one first reference signal from the signal comprises subtracting said at least one first reference signal from a delayed version of the signal received by the first base station.

4. The method of claim 1, wherein subtracting said at least one second reference signal from the modified signal comprises filtering said at least one second reference signal from the modified signal using a time domain filter.

5. The method of claim 1, wherein determining the timing delay comprises comparing an arrival time of said at least one reference signal to a reference time used by the first and second base stations.

6. The method of claim 5, wherein determining the timing delay comprises accumulating a plurality of extracted second reference signals received over multiple subframes and performing timing offset estimation using the accumulated plurality of extracted second reference signals.

7. The method of claim 1, comprising providing information indicative of the timing delay to a mobile location center so that the mobile location center can determine a plurality of relative timing delays between the user equipment, the first base station, the second base station, and at least one third base station, and wherein the mobile location center can triangulate a location of the user equipment using the plurality of relative timing delays.

8. The method of claim 1, wherein said at least one first reference signal and said at least one second reference signal are sounding reference signals formed by cyclically shifting a root sequence.

9. A method, comprising:

modifying a signal received by a first base station using at least one estimated value of at least one first channel received by the first base station, wherein the signal comprises a superposition of said at least one first channel transmitted by first user equipment served by the first base station and at least one second channel transmitted by second user equipment served by a second base station;

extracting said at least one second channel from the modified signal; and determining a timing delay between said second user equipment and the first base station using said at least one extracted second channel.

10. The method of claim 9, comprising determining said at least one estimated value of said at least one first channel by filtering said at least one first channel using a time domain filter.

11. The method of claim 9, wherein extracting said at least one second. channel comprises filtering the modified signal using a time domain filter.

12. The method of claim 11, wherein filtering the modified signal comprises filtering the modified signal to remove channels transmitted by other user equipment served by the second base station.

13. The method of claim 11, wherein determining the timing delay comprises comparing an arrival time associated with said at least one first channel to a reference time used by the first and second base stations.

14. The method of claim 13, wherein determining the timing delay comprises accumulating energy associated with a plurality of second channels received over multiple subframes and performing timing offset estimation using the accumulated energy.

15. The method of claim 11, comprising providing information indicative of the timing delay to a mobile location center so that the mobile location center can determine a plurality of relative timing delays between the user equipment, the first base station, the second base station, and at least one third base station, and wherein the mobile location center can triangulate a location of the user equipment using the plurality of relative timing delays.

16. The method of claim 11, wherein said at least one first channel and said at least one second channel convey sounding reference signals formed by cyclically shifting a root sequence.

* * * * *